United States Patent [19]
Joyce

[11] Patent Number: 5,963,695
[45] Date of Patent: Oct. 5, 1999

[54] OPTICAL MODULE WITH STRESS COMPENSATED FERRULE-CLIP ASSEMBLY

[75] Inventor: William B. Joyce, Basking Ridge, N.J.

[73] Assignee: Lucent Technologies, Inc., Murray Hill, N.J.

[21] Appl. No.: 09/053,264

[22] Filed: Apr. 1, 1998

[51] Int. Cl.$^6$ ..................................................... G02B 6/36
[52] U.S. Cl. ............................... 385/88; 385/90; 385/92; 385/94
[58] Field of Search ......................................... 385/88–94

[56] References Cited

U.S. PATENT DOCUMENTS

| 4,752,109 | 6/1988 | Gordon et al. | 385/88 |
| 5,111,522 | 5/1992 | Chaoui et al. | 385/92 |
| 5,793,915 | 8/1998 | Joyce | 385/91 |
| 5,854,869 | 12/1998 | Joyce | 385/92 |

OTHER PUBLICATIONS

W.B. Joyce et al., "Alignment of Gaussian Beams," Applied Optics, vol. 23 No. 23, Dec. 1, 1984, pp. 4187–4196.

Primary Examiner—Phan Palmer

[57] ABSTRACT

An optical module that compensates for a stress induced displacement is realized by employing asymmetric ferrule and clip assemblies. In one embodiment, the optical module includes a ferrule and clip assembly having posts or vertical members joined thereto with welds positioned along the longitudinal or center axes of the posts. Importantly, however, the effective axis of rotation about which one of the welds rotates under an applied axial displacement is offset along the longitudinal axis. This offset causes the welds to rotate asymmetrically with respect to the rotational axes which are orthogonal to the stress induced displacement, and is advantageously used to compensate for any stress induced displacement of the fiber that is quadratic in nature. In another embodiment, the optical module includes an asymmetric ferrule and clip assembly wherein at least one weld is offset along from the post's longitudinal or center axis, breaking the left-right symmetry of the assembly. Likewise, the welds rotate asymmetrically with respect to the axes orthogonal to the stress induced displacement. This latter rotation is used to compensate for any stress induced displacement, but one that is linear and not quadratic in nature.

17 Claims, 6 Drawing Sheets

5,963,695

OPTICAL MODULE WITH STRESS COMPENSATED FERRULE-CLIP ASSEMBLY

TECHNICAL FIELD

The present invention relates to optical modules and, more particularly, to an optical module wherein stress induced displacements within the module are compensated for so as to maintain the alignment of an optical fiber and optical component enclosed within the module.

BACKGROUND OF THE INVENTION

Optical modules, such as transmitters, receivers and/or transceivers, typically use a so-called "14-pin butterfly" package to house optical components hermetically in a box. Such an optical package includes an assembly platform, typically holding an optical fiber in alignment with an optical component, such as a laser or detector. More specifically, the optical component(s) is soldered to a carrier, and in turn, the carrier to the platform. Moreover, the optical fiber is encased within a ferrule welded to a clip, the clip soldered to another carrier, and, in turn, the carrier soldered to the assembly platform so as to maintain the alignment between the optical fiber and the optical component(s).

During assembly, unwanted stress in the module causes the optical fiber to move relative to the optical component(s), thereby lowering the coupling efficiency. It would therefore be desirable to provide an optical module wherein the effects of the induced stress are compensated for so as to maintain the alignment of the optical fiber and optical component(s).

SUMMARY OF THE INVENTION

Although optical modules are manufactured to be free of stress, a certain amount, whether thermal or mechanical, is still induced during assembly, causing the optical components to move relative to each other. In accordance with the teachings of the present invention, an optical module that compensates for this stress induced displacement is realized by employing asymmetric ferrule and clip assemblies. In one embodiment, the optical module includes a ferrule and clip assembly having posts or vertical members joined thereto with welds $W_1$ and $W_2$ positioned along the longitudinal or center axes of the posts. Importantly, however, the effective axis of rotation about which one of the welds rotates under an applied axial displacement is offset with respect to the other weld along the longitudinal axis. This offset causes welds $W_1$ and $W_2$ to rotate differently or "asymmetrically" about their respective axes of rotation, and is advantageously used to compensate for any stress induced displacement of the fiber that is quadratic in nature.

In another embodiment, the optical module includes an asymmetric ferrule and clip assembly wherein at least one weld is offset along the z-axis from its respective post's longitudinal or center axis, breaking the left-right or z-axis symmetry of the assembly. Likewise, the welds rotate asymmetrically about axes orthogonal to the stress induced displacement. This latter rotation is used to compensate for any stress induced displacement, but one that is linear and not quadratic in nature. Ferrule and clip assemblies may employ both asymmetric designs to simultaneously compensate for both linear and quadratic stress induced displacements.

Thus, the optical modules assembled in accordance with the present invention address the problems associated with prior art optical modules, particularly, undesired induced stress in the module causing, for example, the optical fiber to move relative to the laser.

BRIEF DESCRIPTION OF THE DRAWINGS

The features and advantages of the present invention will become more readily apparent from the following detailed description of the invention in which like elements are labeled similarly and in which.

DETAILED DESCRIPTION

Without any loss of generality or applicability for the principles of the invention, the embodiments below are directed to a laser module. It should, however, be clearly understood that the present invention is equally applicable to an optical receiver, transceiver, and, in general, an optical module housing optical components.

Figure 1:
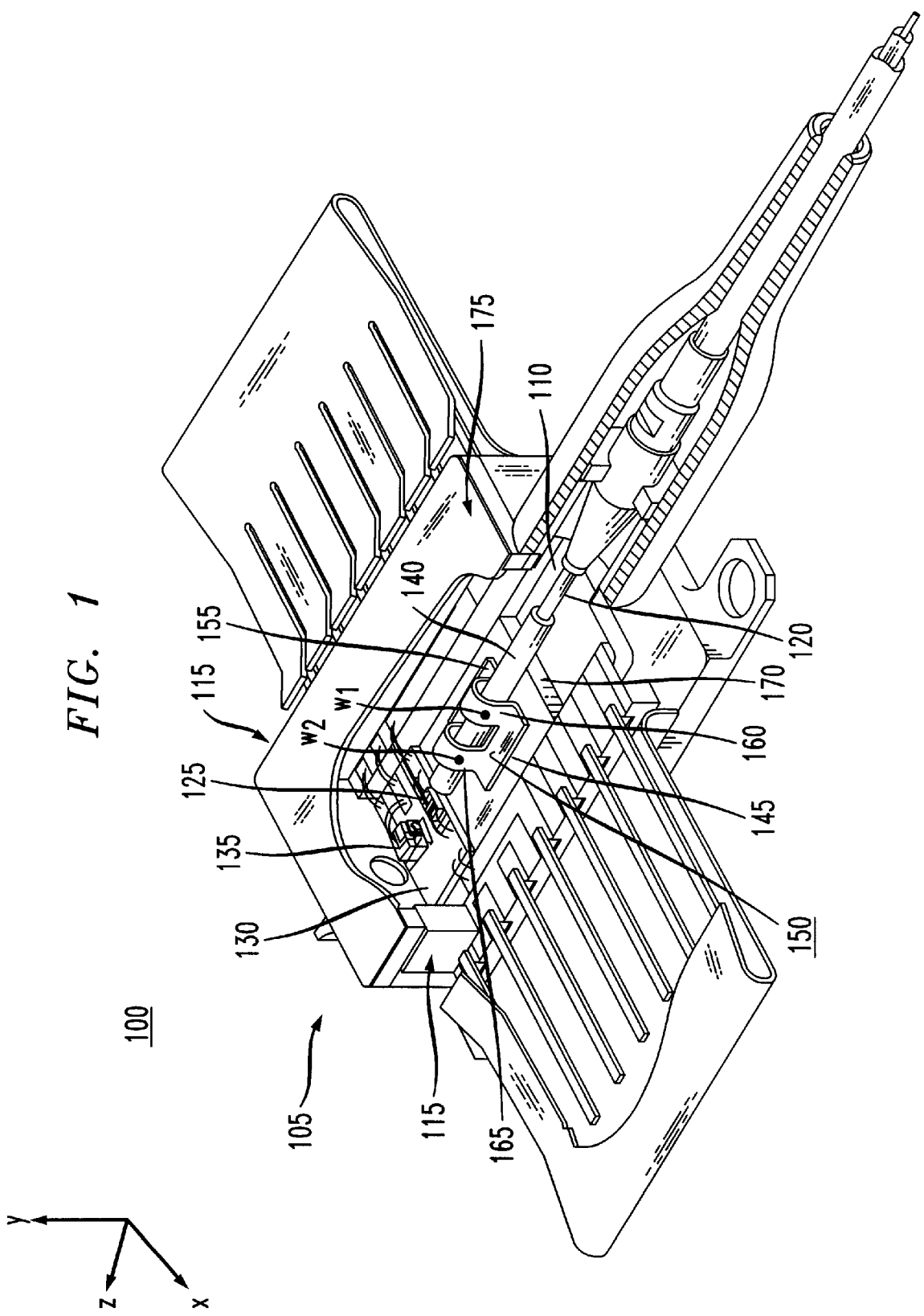
FIG. 1 depicts a perspective cut-away view of a "14-pin butterfly" package laser module using the ferrule-clip assembly of the present invention.
Figure 2:
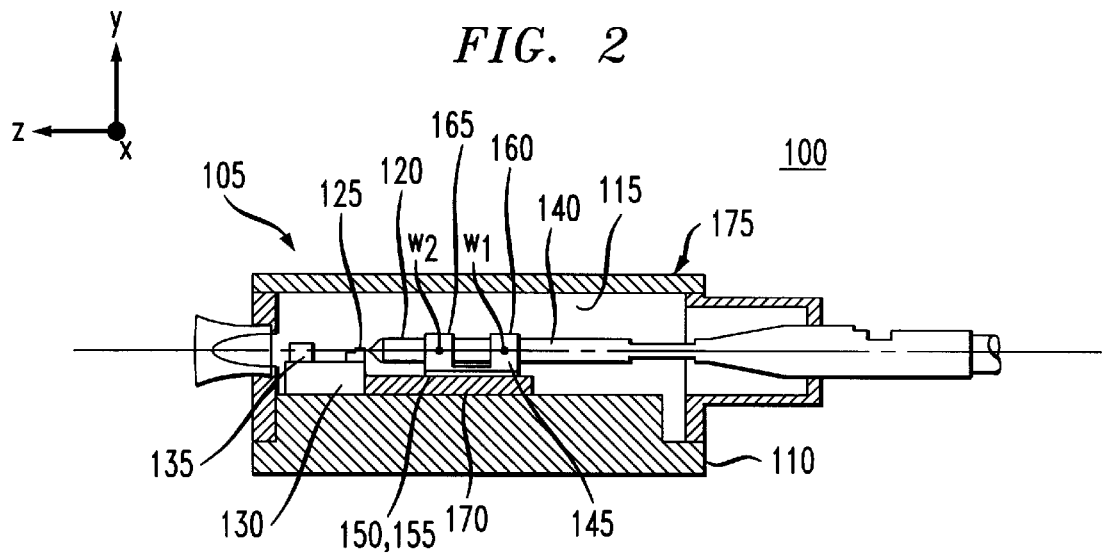
FIG. 2 depicts a cross section view of the laser module of FIG. 1.

Referring to FIGS. 1 and 2, there is shown an exemplary embodiment of a "14-pin butterfly" package laser module 100 comprising: a housing 105 having an opening along its top side for providing access to the interior thereof; an assembly platform 110; and sidewalls 115. There is an opening at an end sidewall of the housing for allowing the passage of an optical fiber 120 into the interior of the housing.

A laser 125 is supported on a carrier 130, and in turn, the carrier attached to assembly platform 110. A photodetector 135 may be also disposed on carrier 130 to monitor the optical power from the laser. Because of mechanical, electrical and thermal considerations, the carrier, sidewalls and assembly platform are usually made of dissimilar materials.

Figure 3:
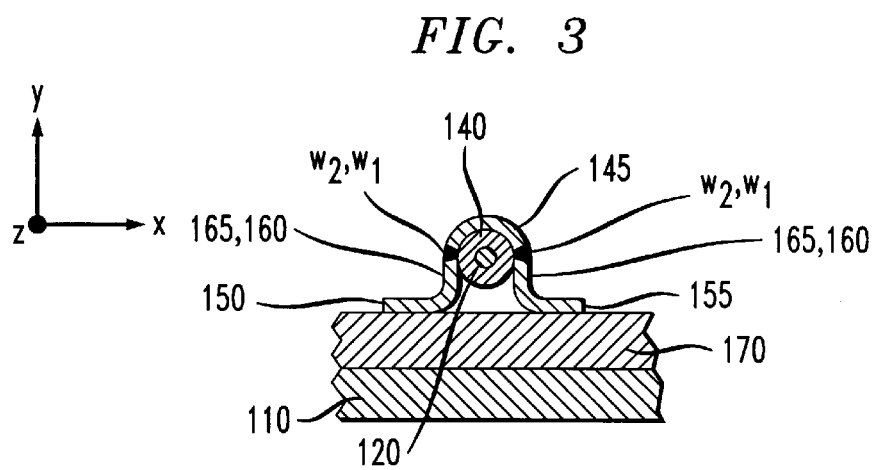
FIG. 3 depicts a cross section view of a ferrule and clip assembly used in securing and maintaining the fiber in alignment with the laser of FIG. 1.
Figure 4:
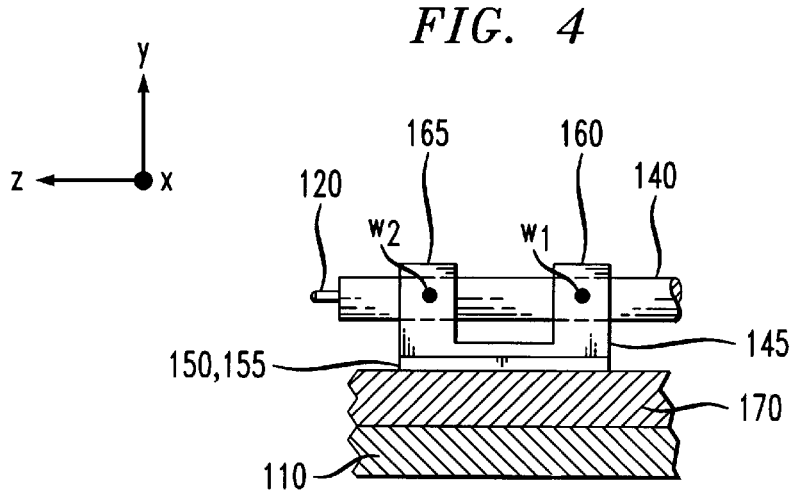
FIG. 4 depicts a side view of the ferrule and clip assembly of FIG. 3.

Optical fiber 120 is held within a metal ferrule 140 which extends through the opening to the exterior of the housing. Alignment between fiber 120 and laser 125 is maintained by an U-shaped clip 145 which is welded to ferule 140, for example, at locations $W_1$ and $W_2$, as discussed in more detail herein below. Referring to FIGS. 3 and 4, clip 145 includes base portions 150, 155 which extend substantially parallel to fiber 120 along the z-axis. Pairs of post or vertical members 160, 165 are joined in an U-shaped manner to form a receiving cavity for ferrule 140. U-shaped clip 145 is soldered to a carrier 170, which is in turn, soldered to assembly platform 110.

Now referring back to FIGS. 1–2, after assembly, a cover 175 is welded to the top opening of housing 105 so as to seal the optical components in the housing and, thereby protects the optical fiber and laser from the environment.

Any undesired induced stress in the module, such as from the hermetic seal or other sources, primarily causes relative displacements of the optical fiber along the y-axis and the z-axis. This is so because the optical module is substantially symmetric with respect to the x-axis, and hence any induced stress is equally divided along that latter axis, resulting in a net zero stress-induced displacement. As a result, however, of the relative displacements along the y and z-axes, the optical coupling between the laser and optical fiber may be substantially reduced. It has been shown that, within limits, any displacement along the z-axis, however, does not significantly affect the coupling efficiency between the laser and fiber. See the article by Joyce et al., entitled "Alignment of Gaussian Beams," *Applied Optics*, Vol. 23, No. 23 pp. 4187–96, December 1984, which is incorporated herein by reference.

Accordingly, the relative displacement along the y-axis is of greater importance and can be expressed as a generalized function of the displacement $\delta z$ along the z-axis induced by the stress within the module as:

$$\delta y = f(\delta z) = A_0 \delta z + A_1 (\delta z)^2 + A_2 (\delta z)^3 + \ldots + A_{n-1}(\delta z)^n \qquad (1)$$

wherein $\delta y$ is the resultant displacement along the y-axis; and $A_0$ through $A_{n-1}$ are constants. In practice, third and higher order terms may be neglected, reducing Eq. (1) to:

$$\delta y = f(\delta z) = A_0 \delta z + A_1 (\delta z)^2 \qquad (2)$$

Accordingly, those skilled in the art will readily recognize that the relative displacement $\delta y$ can be approximated as the sum of a linear, odd order term, and a quadratic, even order term. It should be recalled that for an even order term, $f(\delta z)=f(-\delta z)$, whereas for an odd order term, $f(\delta z)=-f(-\delta z)$.

Figure 5:
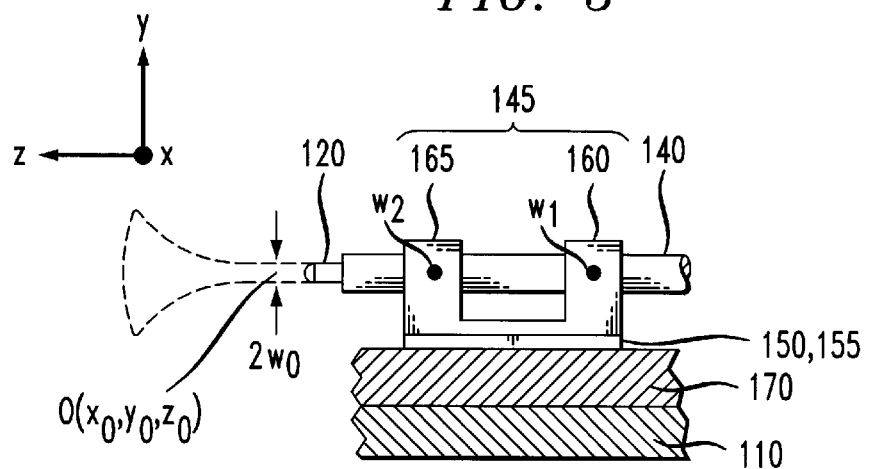
FIG. 5 depicts the propagation of the fiber's mode into real space.

In accordance with the teachings of the present invention, any stress induced, axial displacement may be compensated for by a properly designed clip and ferrule assembly which properly maintains the alignment of the fiber to the laser, as discussed below. More specifically, it is intended that a predetermined point O within the fiber's mode located at coordinates $(x_0, y_0)$ be maintained at that location, even under an applied axial displacement. This is better illustrated in FIG. 5, which depicts the projection of the mode of the fiber into real space, having a beam waist of $2W_0$. The location of the predetermined point $O(x_0 y_0 z_0)$ within the fiber's mode is chosen to maximize the optical coupling into the laser, and methods how to do so are well known in the art. Under an applied stress, however, this predetermined point $O(x_0 y_0 z_0)$ is displaced along the y-axis and z-axis. In accordance with the principles of the invention, asymmetric clip and ferrule assemblies are proposed which compensate for stress induced, linear and quadratic displacements so as to maintain the y-coordinate of the predetermined point O.

As noted above, due to the optical module's symmetry along the x-axis, any stress induced displacement along that axis is minimal, if any. Also, although the location is allowed to vary along the z-axis, i.e., a tilt or an axial displacement, such a tilt or displacement, within limits, has been shown not to significantly affect the coupling efficiency between the laser and fiber. See, for example, the aforementioned article by Joyce et al.

Figure 6:
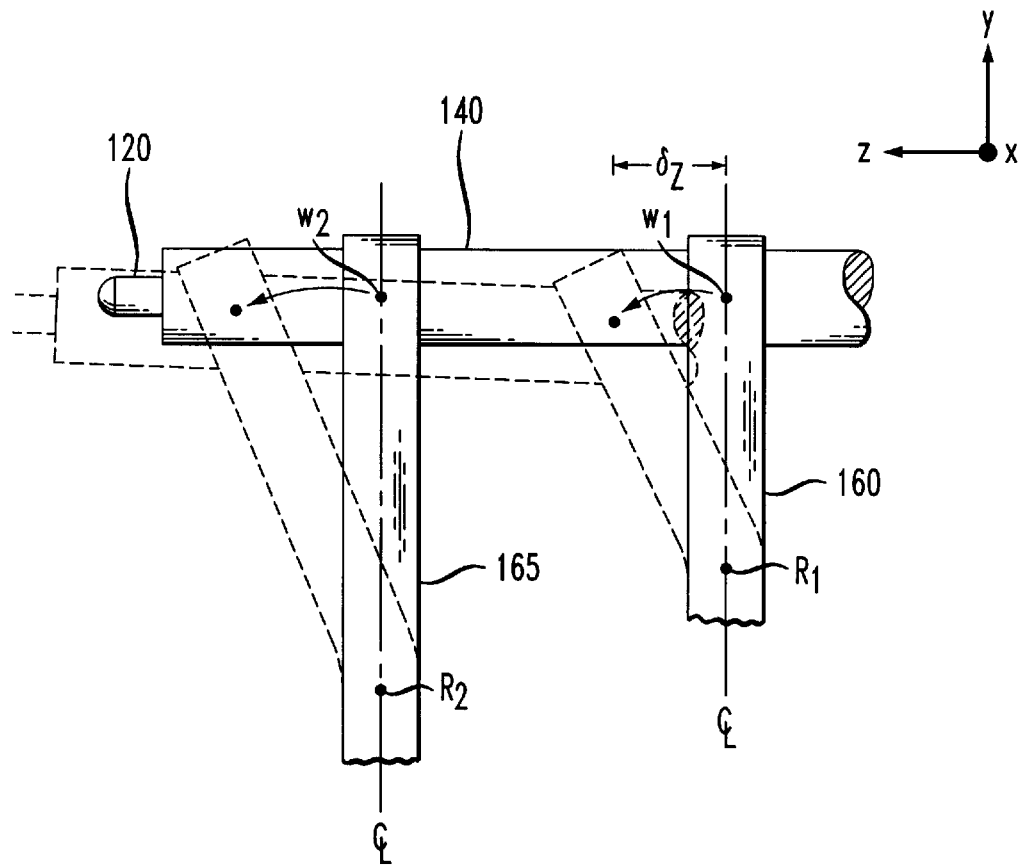
FIG. 6 depicts a ferrule and clip assembly constructed in accordance with the present invention to compensate for a stress induced, quadratic displacement of the optical fiber.

Shown in FIG. 6 is an exemplary arrangement of an asymmetric ferrule and clip assembly capable of compensating for the stress induced, quadratic displacement term of Eq. (1). It should be recalled that U-shaped clip 145 consists of posts or vertical structures 160, 165 joined to ferrule 140 with welds $W_1$ and $W_2$ positioned along the respective longitudinal or center axes of the posts. It should be understood, however, that multiple welds can be used, wherein $W_1$ and $W_2$ would then be the effective centers of the welds. In this embodiment, however, the effective location of the axis of rotation $R_1$ for post or vertical member 160 has been modified so that it is raised along the y-axis with respect to the other, $R_2$, causing an "asymmetric" rotation about the axes with respect to the other and along the direction of the z-axis, as discussed herein below. Of course, alternatively, the effective location of the axis of rotation $R_2$ could have been raised instead with respect to axis $R_1$.

It should be clearly understood that the term "asymmetric" rotation herein refers to the fact that the fiber portion or weld at location $W_1$ rotates about $R_1$ in a different manner and/or by a different amount with respect to the rotation of the fiber or weld at location $W_2$ about $R_2$. In other words, the fiber portion or weld located on left post or member 165 rotates in a different manner than the fiber portion or weld on right post or member 160, and hence the rotations do not mirror each other along the z-axis.

Figure 7:
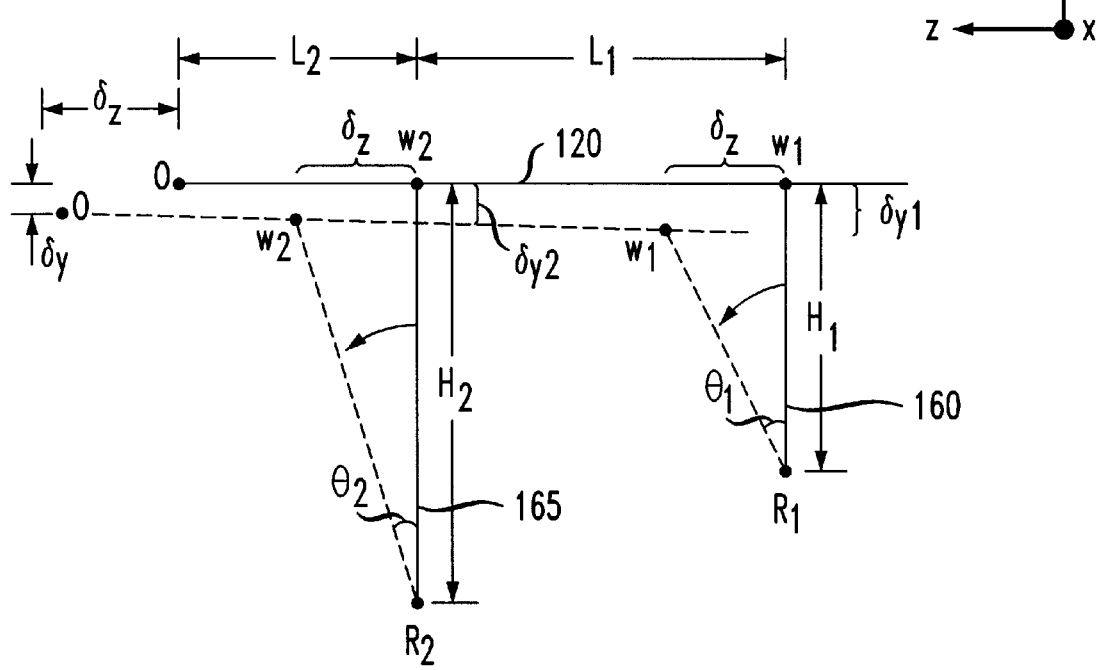
FIG. 7 depicts a schematic representation of the ferrule and clip assembly of FIG. 6 under an applied axial displacement.

To more clearly depict this latter asymmetric rotational motion, a schematic representation of FIG. 6 is illustrated in FIG. 7. When ferrule 140 is displaced axially a distance $\delta z$, weld locations $W_1$ and $W_2$ rotate about axes $R_1$ and $R_2$, respectively, as illustrated in phantom. The depicted rotational motion assumes that the welds do not transmit a moment coupled to the ferrule. Inasmuch as the rotation length for post 160, $\overline{H_1} = \overline{W_1 R_1}$, is shorter than that of the other, $\overline{H_2} = \overline{W_2 R_2}$, weld location $W_1$ is rotationally displaced a distance lower than $W_2$ along the y-axis. That is, the rotation is asymmetric along the z-axis about axes $R_1$ and $R_2$. This asymmetric rotation results in the end of the optical fiber being tilted slightly upward, and being displaced along the z-axis. As mentioned previously, angular as well as z-axis tolerances are quite large. As such, this tilt or axial displacement, within limits, does not substantially affect the coupling efficiency between the fiber and the laser.

For small angular rotations, however, these latter displacements along the y-axis may be expressed for welds $W_1$ and $W_2$ as:

$$\delta y_1 = H_1 - H_1 \cos\theta_1 \qquad (3)$$

$$\delta y_2 = H_2 - H_2 \cos\theta_2 \qquad (4)$$

where $\delta y_1$ and $\delta y_2$ are the displacements of welds $W_1$ and $W_2$, respectively, along the y-axis; $\theta_1$ is the angle through which $W_1$ rotates; and $\theta_2$ is the angle through which $W_2$ rotates. Substituting $\sin\theta_1 = \delta z / H_1$ and $\sin\theta_2 = \delta z / H_2$ into Eqs. (3) and (4) yields:

$$\delta y_1 = -\frac{1}{2}\left(\frac{\delta z}{H_1}\right)^2 \qquad (5)$$

-continued $$\delta y_2 = -\frac{1}{2}\left(\frac{\delta z}{H_2}\right)^2 \quad (6)$$

Using trigonometrical substitutions for δz into Eqs. (5) and (6), it can be shown that point O which extends along the optical axis of the optical fiber is displaced a distance δy, given approximately by:

$$\delta y = \delta y_2 - (\delta y_1 - \delta y_2)\frac{L_2}{L_1} \quad (7)$$

where $L_2$ is the distance between $W_2$ and point O along the z-axis, and $L_1$ is the distance along the z-axis between $W_2$ and $W_1$.

As discussed above, inasmuch as the objective is to compensate for induced stress displacements so as to maintain the y coordinate of point O, the dimensions $H_1$, $H_2$, $L_1$ and $L_2$ can be judiciously selected so as to compensate for the quadratic term of Eq. (1). This may be mathematically expressed by setting $A_1(\delta z)_2$ equal to $\delta y_2-(\delta y_1-\delta y_2)L_2/L_1$ such that the y-position is invariant with any δz displacement.

It is contemplated that the quadratic displacement term in Eq. (1) may be readily determined empirically, through the use of finite element analysis, or by any other suitable modeling means known in the art for the optical module. For example, the stress induced displacements may be measured experimentally on optical modules that do not employ the present invention, and then measured with an asymmetric clip and ferrule assembly designed to compensate for such displacements.

Figure 8:
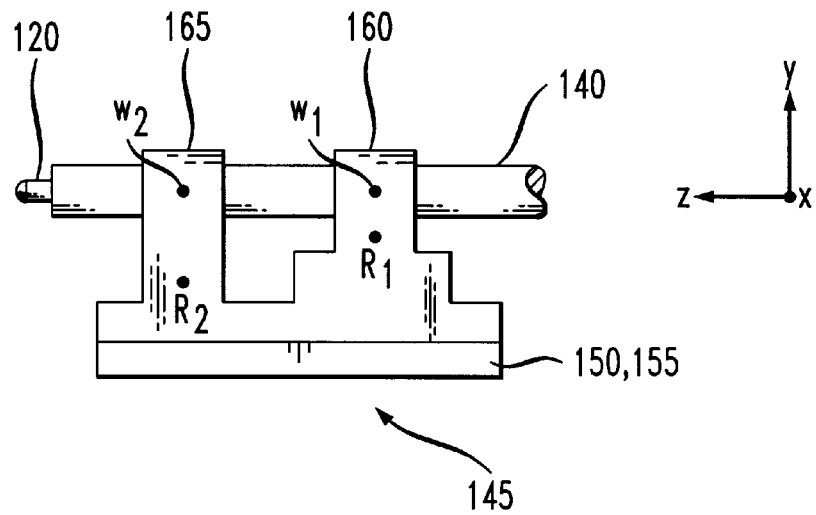
FIGS. 8–9 depict different embodiments of clips having asymmetric axes of rotation.
Figure 9:
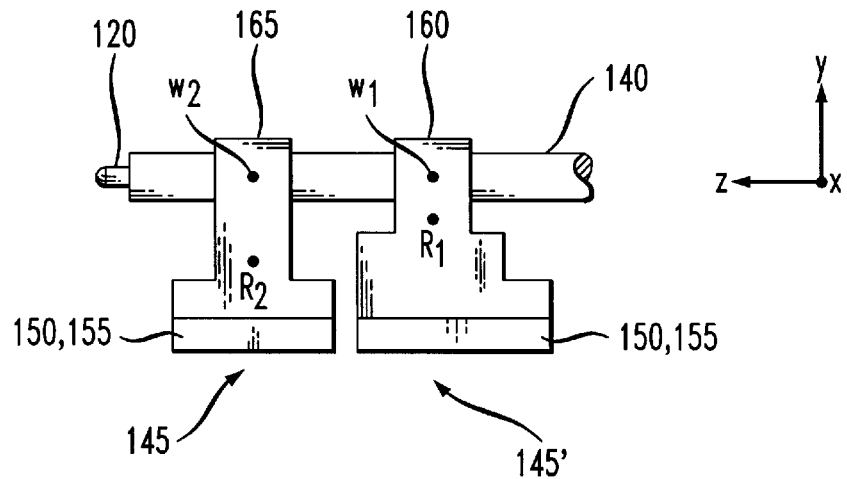

Furthermore, it is contemplated that $H_1$ and $H_2$ may be adjusted by accordingly varying, for example, in a step-wise manner the width of post or vertical members 160, 165 so as to displace their effective axes of rotation, as shown in FIG. 8. Also, although posts 160, 165 have been shown as being integral with base portions 150, 155, it is further contemplated that an equivalent clip having two or more clips 145', each with a single post or vertical member may also be used, as further illustrated in FIG. 9.

Figure 10:
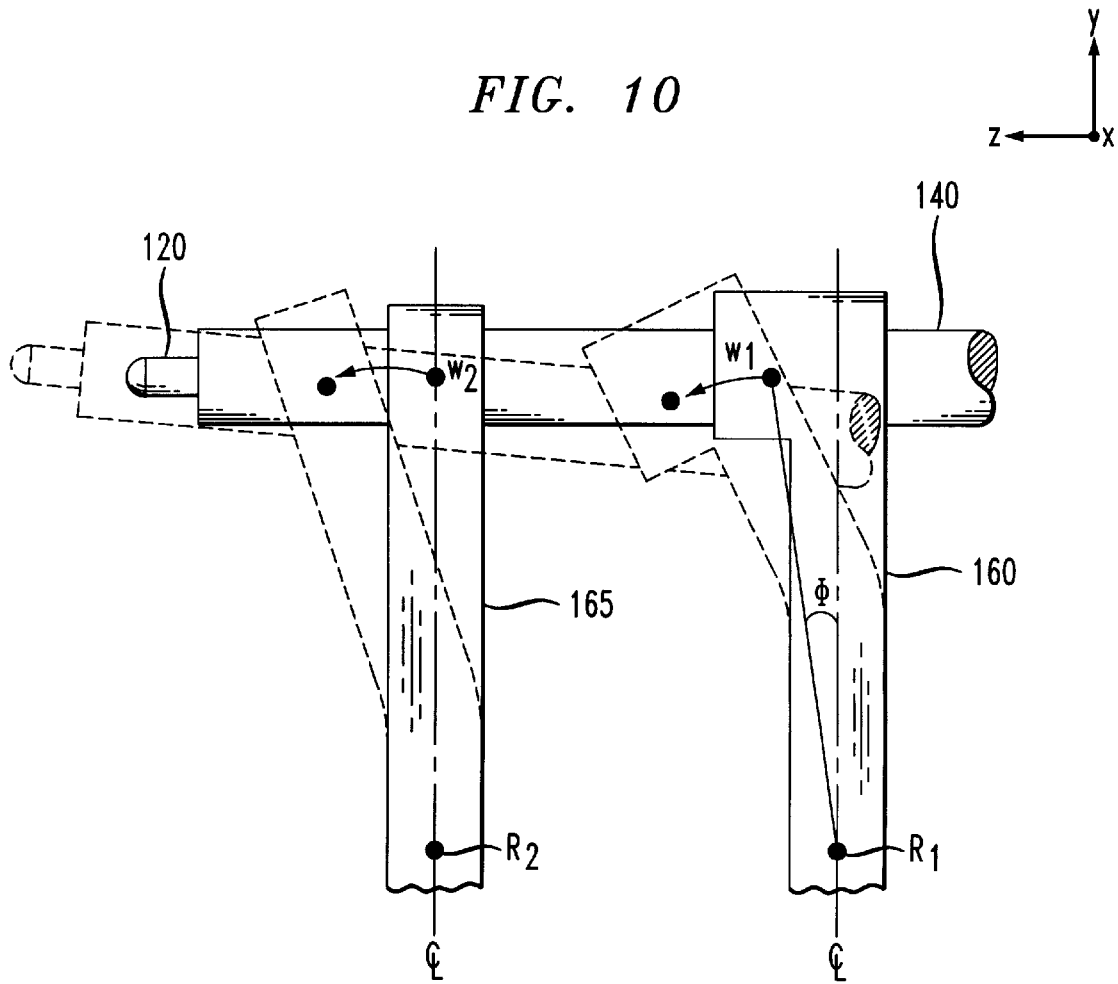
FIG. 10 depicts another embodiment of a ferrule and clip assembly constructed in accordance with the present invention to compensate for a stress induced, linear displacement of the optical fiber.
Figure 11:
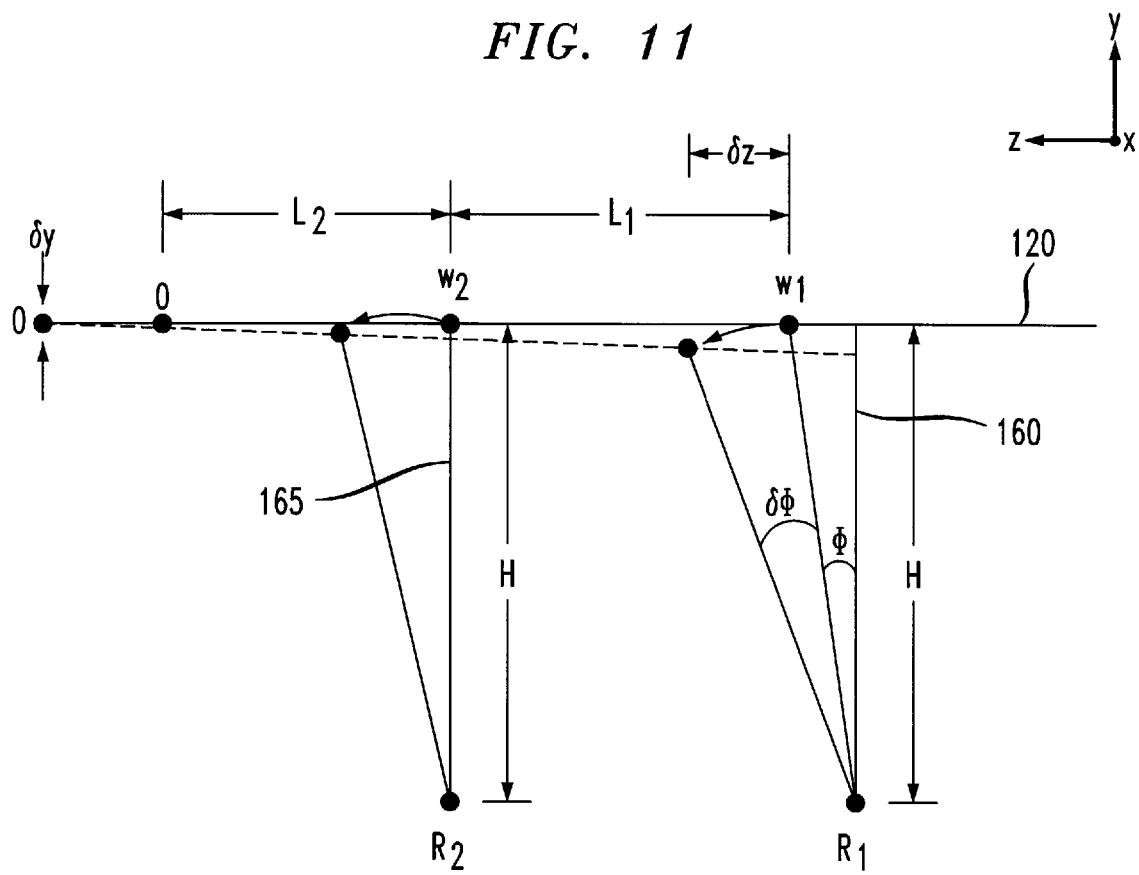
FIG. 11 depicts a schematic representation of the motion of the ferrule and clip assembly of FIG. 10 under an applied axial displacement.

As mentioned above, in response to a δz displacement, there also may be a corresponding stress induced displacement along the y-axis that varies linearly with δz. Shown in FIG. 10 is an exemplary ferrule and clip assembly capable of compensating for the linear, stress induced displacement term of Eq. (1). In particular, weld location $W_2$ for post 160 is offset from the post's longitudinal or center axis by an angle Φ, breaking the left-right symmetry (z-axis). As such, this angular offset causes location $W_1$ to be rotationally displaced a distance lower than $W_2$, again resulting in an "asymmetric" rotation. This rotation similarly causes the end of the optical fiber to be tilted slightly upward and displaced along the z-axis. This is more clearly illustrated in FIG. 11, depicting in schematic form the rotational motion in response to a displacement along the z-axis. For small angles, $W_1$ is displaced along the y-axis a distance, HsinΦδΦ. Using the trigonometrical substitution that δz=HδΦ, it can be shown that for a given displacement along the z-axis, point O is displaced a corresponding amount δy given by:

$$\delta y = \Phi\frac{L_2}{L_1}\delta z \quad (8)$$

Likewise, the dimensions $L_1$ and $L_2$ can then be judiciously chosen to compensate for the linear term of Eq. (1). Inasmuch as δy varies linearly with δz, $\Phi L_2/L_1\delta z$ can be chosen to compensate for the linear term, $A_0\delta z$ such that the y-position of point O is again invariant with any δz displacement. This latter linear term can similarly be determined empirically, through the use of finite element analysis, or by any other suitable modeling means known in the art.

Figure 12:
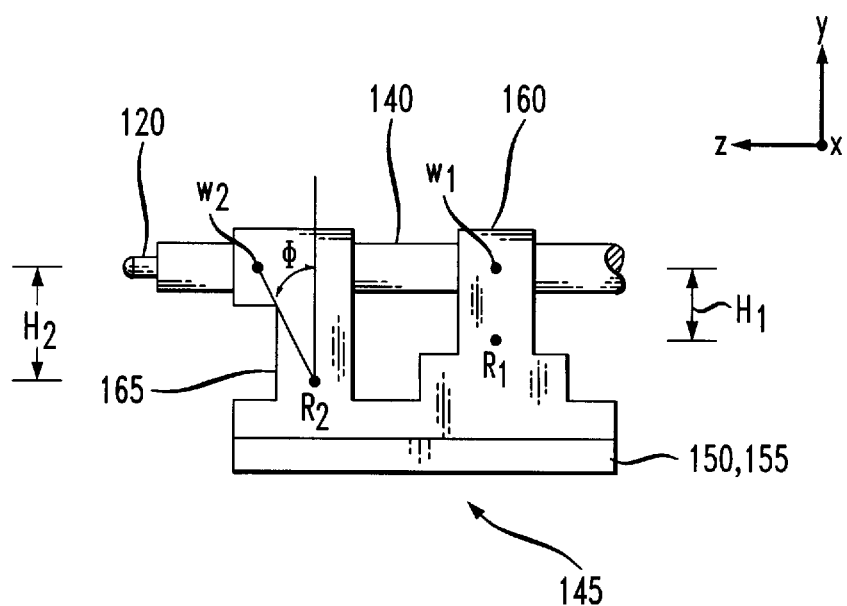
FIG. 12 depicts still another embodiment of a ferrule and clip assembly constructed in accordance with the present invention to compensate for stress induced, linear and quadratic displacements of the optical fiber.

Also, it should be clearly understood that both asymmetric ferrule and clip designs may be employed in a single assembly, as illustrated in FIG. 12. In addition to the axes of rotation $R_1$, $R_2$ being offset relative to each other along the y-axis, weld $W_2$ may also be simultaneously displaced from the post's center axis by an angle Φ. In this manner both the linear and quadratic terms of Eq. (1) can be compensated for in a single ferrule-clip assembly.

It should be understood that the embodiments herein are merely illustrative of the principles of the invention. Various modifications may be made by those skilled in the art which will embody the principles of the invention and fall within the spirit and the scope thereof.

I claim:

1. An optical module for holding an optical fiber and optical component in alignment, said module comprising:
    a housing having a platform for supporting the optical fiber and optical component, said optical fiber having an optical axis denoted as the z-axis;
    a ferrule surrounding said optical fiber; and
    a clip assembly secured to said ferrule at joining points $W_1$ and $W_2$ for causing points $W_1$ and $W_2$ to rotate asymmetrically about axes of rotation $R_1$ and $R_2$, respectively, such that in response to the optical fiber being displaced along the z-axis, a predetermined point a distance away from said fiber maintains its position along a y-axis orthogonal to the z-axis.

2. The optical module of claim 1 wherein said joining points $W_1$ and $W_2$ are located distances $H_1$ and $H_2$ from said axes of rotation $R_1$ and $R_2$, respectively.

3. The optical module of claim 2 wherein the distances $H_1$ and $H_2$ are of different lengths.

4. The optical module of claim 2 wherein said joining points $W_1$ and $W_2$ lie along first and second directions passing through the axes of rotation $R_1$ and $R_2$, respectively, and orthogonal to the z-axis.

5. The optical module of claim 2 wherein said joining point $W_1$ lies along a first direction passing through said axis of rotation $R_1$ and at a predetermined angle from the y-axis, and said joining point $W_2$ lies along a second direction passing through the axis of rotation $R_2$ and orthogonal to the z-axis.

6. The optical module of claim 1 wherein said clip assembly includes first and second vertical members.

7. The optical module of claim 6 wherein the width of said first vertical member varies along the y-axis.

8. The optical module of claim 1 wherein said clip assembly is secured to said ferrule with welds located at joining points $W_1$ and $W_2$.

9. The optical module of claim 1 wherein said optical component is a laser.

10. An optical module for holding an optical fiber and an optical component in alignment, said module comprising:

a housing having a platform for supporting the optical fiber and optical component, said optical fiber having an optical axis denoted as the z-axis;

a ferrule surrounding said fiber; and a clip assembly having first and second post members for securing to said ferrule at locations $W_1$ and $W_2$ which are located distances $H_1$ and $H_2$, respectively, from axes of rotation $R_1$ and $R_2$, about which axes said clip assembly effectively pivots when displaced along the z-axis, said distances $H_1$ and $H_2$ being of different lengths so as to cause said locations $W_1$ and $W_2$ to rotate asymmetrically about axes $R_1$ and $R_2$, respectively, such that in response to said fiber being displaced along the z-axis, a predetermined point a distance away from said fiber maintains its position along a y-axis orthogonal to the z-axis.

11. The optical module of claim 10 wherein said locations $W_1$ and $W_2$ lie along first and second directions passing through the axes of rotation $R_1$ and $R_2$, respectively, and orthogonal to the z-axis.

12. The optical module of claim 10 wherein said clip assembly is secured to said ferrule with welds located at locations $W_1$ and $W_2$.

13. The optical module of claim 10 wherein the width of said first vertical member varies along the y-axis.

14. The optical module of claim 10 wherein said optical component is a laser.

15. An optical module for holding an optical fiber and an optical component in alignment, said module comprising:

a housing having a platform for supporting the optical fiber and optical component, said optical fiber having an optical axis denoted as the z-axis;

a ferrule surrounding said fiber; and a clip assembly having first and second post members for securing to said ferrule at points $W_1$ and $W_2$ which are located a distance H from axes of rotation $R_1$ and $R_2$, respectively, about which axes said clip assembly effectively pivots when displaced along the z-axis, said point $W_2$ lying along a direction passing through the axis of rotation $R_2$ and orthogonal to the z-axis, and said point $W_1$ lying along a direction passing through the axis of rotation $R_1$ and at a predetermined angle from a y-axis so as to cause said points $W_1$ and $W_2$ to rotate asymmetrically about axes $R_1$ and $R_2$, respectively, such that in response to said fiber being displaced along the z-axis a predetermined point a distance away from said fiber maintains its position along the y-axis orthogonal to the z-axis.

16. The optical module of claim 15 wherein said clip assembly is secured to said ferrule with welds located at points $W_1$ and $W_2$.

17. The optical module of claim 15 wherein said optical component is a laser.

* * * * *